(12) United States Patent
Niida

(10) Patent No.: US 9,955,081 B2
(45) Date of Patent: Apr. 24, 2018

(54) IMAGING APPARATUS CAPABLE OF ADJUSTING IMAGING RANGE TO INCLUDE TARGET REGION, CONTROL METHOD OF IMAGING APPARATUS, AND STORAGE MEDIUM STORING PROGRAM THEREFOR

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/935,303

(22) Filed: Nov. 6, 2015

(65) Prior Publication Data

US 2016/0142640 A1 May 19, 2016

(30) Foreign Application Priority Data

Nov. 18, 2014 (JP) ................................. 2014-233793

(51) Int. Cl.
*H04N 5/225* (2006.01)
*H04N 5/232* (2006.01)

(52) U.S. Cl.
CPC ..... *H04N 5/23296* (2013.01); *H04N 5/23206* (2013.01); *H04N 5/23219* (2013.01)

(58) Field of Classification Search
USPC .................................................... 348/211.3
See application file for complete search history.

(56) References Cited

U.S. PATENT DOCUMENTS

| | | | | |
|---|---|---|---|---|
| 6,822,676 B1* | 11/2004 | Kurosawa | .......... | H04N 5/23203 348/207.1 |
| 2007/0242143 A1* | 10/2007 | Sugimoto | .......... | H04N 5/23293 348/240.2 |
| 2011/0267503 A1* | 11/2011 | Kunishige | .............. | H04N 5/232 348/240.1 |
| 2012/0249813 A1* | 10/2012 | Miyasako | .............. | H04N 5/232 348/208.4 |
| 2013/0120617 A1* | 5/2013 | Kim | ................... | H04N 5/23296 348/240.2 |
| 2013/0155182 A1* | 6/2013 | Bekiares | ............ | H04N 5/23203 348/36 |

FOREIGN PATENT DOCUMENTS

JP      2004-157869 A      6/2004

* cited by examiner

*Primary Examiner* — Twyler L Haskins
*Assistant Examiner* — Dwight Alex C Tejano
(74) *Attorney, Agent, or Firm* — Canon USA Inc., IP Division

(57) ABSTRACT

An imaging apparatus receives a command including a first coordinate value and a second coordinate value, from a client apparatus. A determination unit determines whether or not a target region exists at or near a boundary of an imaging range corresponding to the first coordinate value and the second coordinate value. In a case in which the determination unit determines that the target region exists at the boundary of the imaging range, a control unit adjusts an imaging range to include the target region. In a case in which the determination unit determines that the target region does not exist at the boundary of the imaging range, the control unit sets an imaging range to be captured, to the imaging range corresponding to the first coordinate value and the second coordinate value.

25 Claims, 8 Drawing Sheets

FIG. 4A

| 3001 | 3003 | 3005 | 3007 | 3009 STARTING POINT COORDINATE FIELD | | 3015 ENDING POINT COORDINATE FIELD | |
|---|---|---|---|---|---|---|---|
| DESTINATION ADDRESS | TRANSMISSION SOURCE ADDRESS | SetBoxZoom REQUEST | ProfileToken FIELD | X COORDINATE (NORMALIZED) (-1.0 TO +1.0) 3011 | Y COORDINATE (NORMALIZED) (-1.0 TO +1.0) 3013 | X COORDINATE (NORMALIZED) (-1.0 TO +1.0) 3017 | Y COORDINATE (NORMALIZED) (-1.0 TO +1.0) 3019 |

FIG. 4B

| 3021 | 3023 | 3025 |
|---|---|---|
| DESTINATION ADDRESS | TRANSMISSION SOURCE ADDRESS | SetBoxZoom RESPONSE |

IMAGING APPARATUS CAPABLE OF ADJUSTING IMAGING RANGE TO INCLUDE TARGET REGION, CONTROL METHOD OF IMAGING APPARATUS, AND STORAGE MEDIUM STORING PROGRAM THEREFOR

BACKGROUND OF THE INVENTION

Field of the Invention

The present invention relates to a control method and a control apparatus of an imaging range of an imaging apparatus.

Description of the Related Art

There has been conventionally a system that changes an imaging direction of a monitoring camera according to an instruction received from a user via a network. Such a system also changes an imaging angle of view by controlling zooming such as by setting telephoto/wide-angle imaging. In addition, there has been proposed issuing a change instruction of a zoom magnification, on an image displayed on a monitor of a digital camera or a mobile terminal.

For example, Japanese Patent Application Laid-Open No. 2004-157869 discloses a technique for displaying, on a screen of a mobile terminal, a region designated by a user, and performing zooming control so that an image of the region is enlarged and displayed in a full-screen manner.

Nevertheless, since a screen of a conventional imaging apparatus such as, for example, a mobile terminal having a camera function is small, a region desired by a user may fail to be designated. In addition, even if a large screen is provided, a similar situation can be caused in a case in which the user is in a hurry to make a selection. There can also be caused a situation in which an object serving as a target region moves after user designation.

SUMMARY OF THE INVENTION

In view of the above issues, the present invention aims to assist an operation of a user so that an image of a region desired by the user can move accurately be displayed.

According to an aspect of the present invention, an imaging apparatus includes a reception unit configured to receive a command including a first coordinate value and a second coordinate value, from a client apparatus, a control unit configured to control an imaging range of the imaging apparatus, and a determination unit configured to determine whether or not a target region exists near a boundary of an imaging range corresponding to the first coordinate value and the second coordinate value. In the imaging apparatus, in a case in which the determination unit determines that the target region exists at the boundary of the imaging range, the control unit adjusts an imaging range to be captured, from the imaging range corresponding to the first coordinate value and the second coordinate value to an imaging range including the target region, and in a case in which the determination unit determines that the target region does not exist at the boundary of the imaging range, the control unit sets an imaging range to be captured, to the imaging range corresponding to the first coordinate value and the second coordinate value.

Further features of the present invention will become apparent from the following description of exemplary embodiments (with reference to the attached drawings).

BRIEF DESCRIPTION OF THE DRAWINGS

FIGS. 4A and 4B are diagrams illustrating respective structures of a SetBoxZoom command and a SetBoxZoom response that are used in the present exemplary embodiment.

DESCRIPTION OF THE EMBODIMENTS

Figure 1A:
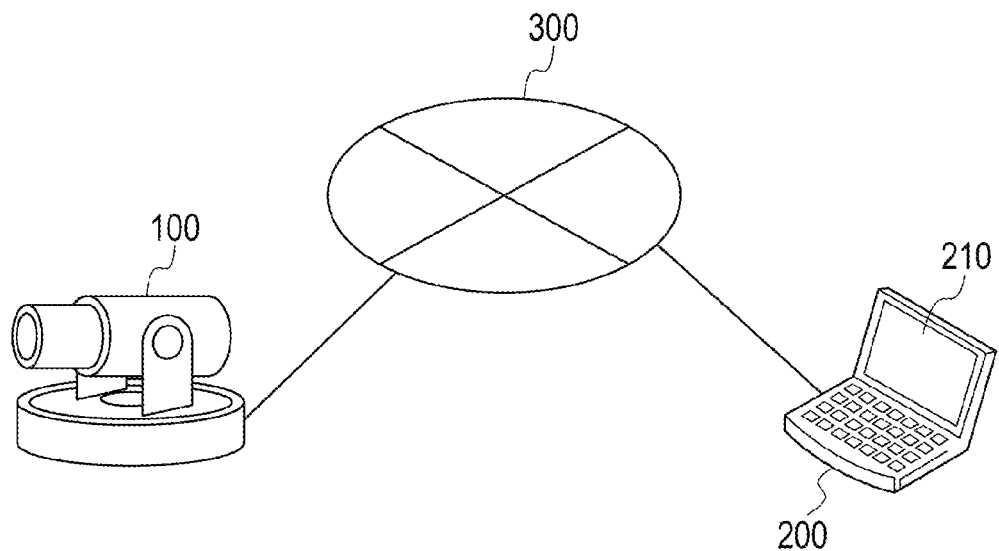
FIG. 1A illustrates a configuration of an imaging system according to an exemplary embodiment.

An exemplary embodiment of the present invention will be described below with reference to the drawings. FIG. 1A is a diagram illustrating an example of a system configuration of an imaging system according to the present exemplary embodiment. In the imaging system according to the present exemplary embodiment, an imaging apparatus 100 is connected via a network 300 to a client apparatus 200, which is an external apparatus.

The imaging apparatus 100 delivers a captured image to the client apparatus 200 via the network 300. In addition, the imaging apparatus 100 according to the present exemplary embodiment is a monitoring camera for capturing a moving image. The communication executed between the imaging apparatus 100 and the client apparatus 200 is communication defined by the Open Network Video Interface Forum (ONVIF), for example. In addition, the imaging apparatus 100 according to the present exemplary embodiment may be installed on, for example, a wall surface or a ceiling.

The client apparatus 200 is formed by an information processing apparatus such as, for example, a general personal computer or a mobile terminal. The client apparatus 200 includes a display unit 210, and issues control instructions such as those for pan, tilt, and zooming of the imaging apparatus 100, on a screen of the display unit 210.

The client apparatus 200 transmits a command to the imaging apparatus 100. For example, the client apparatus 200 transmits a command (request) for changing an imaging direction or a zoom magnification of the imaging apparatus 100, in a format defined by the ONVIF. In addition, the imaging apparatus 100 changes an imaging direction according to a command for changing an imaging direction (pan or tilt) that is received from the client apparatus 200. In addition, the imaging apparatus 100 changes a zoom magnification according to a command for changing a zoom magnification that is received from the client apparatus 200.

The network 300 is formed by a plurality of routers, switches, cables, and the like that satisfy a predetermined communication standard. In the present exemplary embodiment, the communication standard, the scale, and the configuration of the network 300 are not limited as long as communication can be performed between the imaging apparatus 100 and the client apparatus 200. For example, the network 300 may be realized by any of the Internet, a wired local area network (LAN), a wireless LAN, wide area network (WAN), and the like.

Figure 1B:
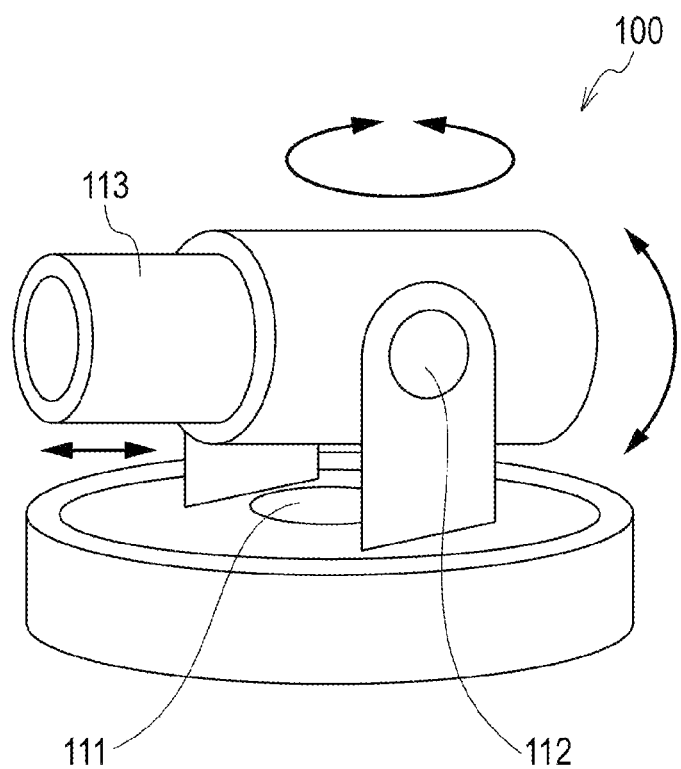
FIG. 1B illustrates an imaging apparatus having drive mechanism according to the present exemplary embodiment.

FIG. 1B is a diagram illustrating an example of a drive mechanism of the imaging apparatus 100 according to the present exemplary embodiment. A pan drive mechanism 111 changes the direction of the imaging apparatus 100 in a pan direction (a direction horizontal to a ground contact surface of the imaging apparatus 100). In addition, a tilt drive mechanism 112 changes the direction of the imaging apparatus 100 in a tilt direction (a direction vertical to the ground contact surface of the imaging apparatus 100). Furthermore, a zoom drive mechanism 113 changes a zoom magnification of the imaging apparatus 100. In other words, these drive mechanisms, i.e., the pan drive mechanism 111, the tilt drive mechanism 112, and the zoom drive mechanism 113 are mechanisms for respectively changing pan, tilt, and zoom of the imaging apparatus 100. With this configuration, an imaging angle of view of the imaging apparatus 100 can be changed. In addition, in the present exemplary embodiment, the pan drive mechanism 111, the tilt drive mechanism 112, and the zoom drive mechanism 113 are each formed by a stepping motor, a gear, and the like.

Figure 2:
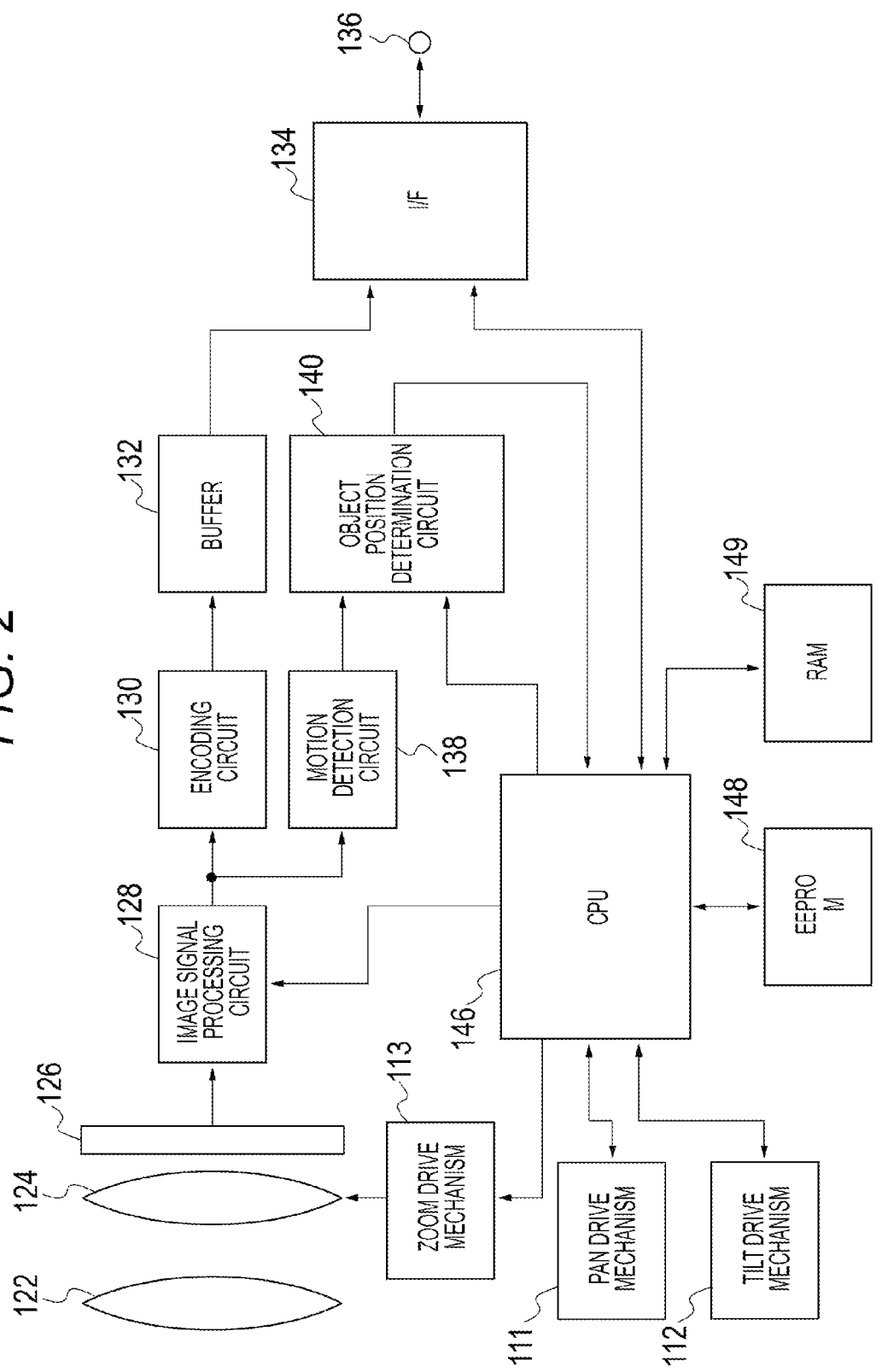
FIG. 2 is a block diagram illustrating a functional hardware configuration of an imaging apparatus 100 according to the present exemplary embodiment.

FIG. 2 is a block diagram illustrating an example of a hardware configuration of the imaging apparatus 100 according to the present exemplary embodiment. In FIG. 2, a central processing unit (CPU) 146 is a central arithmetic processing circuit for comprehensively controlling the imaging apparatus 100. An electrically erasable programmable read only memory (EEPROM) 148 stores a software program for operating the CPU 146. A random access memory (RAM) 149 is a memory for temporarily storing various types of information.

The pan drive mechanism 111, the tilt drive mechanism 112, and the zoom drive mechanism 113 perform driving based on control signals generated by the CPU 146 interpreting commands received from the client apparatus 200.

A front lens 122 and a variator lens 124 constitute an imaging optical system. The variator lens 124 moves in an optical axis direction based on a drive signal from the CPU 146. In other words, a focal length of the imaging optical system changes according to the movement of the variator lens 124, thereby changing a zoom magnification.

An image sensor 126 is an image sensor such as a complementary metal-oxide semiconductor (CMOS) sensor. An image signal processing circuit 128 converts an image signal (RGB) output from the image sensor 126, into an image signal such as a luminance color difference signal. An encoding circuit 130 encodes the converted image signal based on a standard such as the H.264 or the H.265. A buffer 132 temporarily stores the encoded image signal to transmit the image signal onto a network. A communication circuit (hereinafter, may be referred to as an interface (I/F)) 134 and a communication terminal 136 output the encoded image signal to the client apparatus 200 on the network. A motion detection circuit 138 analyzes, using an existing technique, an image signal output from the image signal processing circuit 128, to detect the motion of an object within an image.

An object position determination circuit 140 determines as an object a region where a motion is detected, or determines as an object a region of a portion where a face is recognized or a portion where a human body is detected, in a region where a motion is detected. The object position determination circuit 140 thereby identifies a position in the image. In the present exemplary embodiment, the determined object will be described as a detected object. In addition, while a region of the detected object may be described as a target region, a bounding rectangle of the detected object will be hereinafter described to as a target region.

In the present exemplary embodiment, by correcting a pan/tilt/zoom operation by the user, pan/tilt/zoom control is executed so that an object position falls within an imaging angle of view. In other words, when pan/tilt/zoom is controlled based on a control signal from the client apparatus 200, if an object possibly exists near the end of an imaging angle of view, the CPU 146 finely adjusts a pan/tilt/zoom operation so that the object falls within the angle of view.

Figure 8:
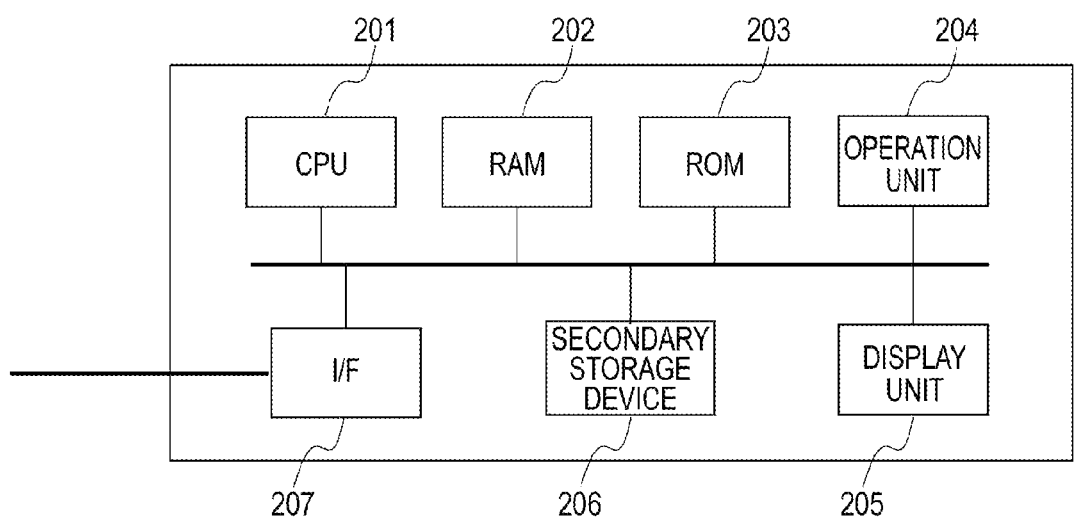
FIG. 8 is a diagram illustrating a hardware configuration of a client apparatus 200.

FIG. 8 is a diagram illustrating a hardware configuration of the client apparatus 200. A CPU 201 controls the entire client apparatus 200 using a computer program and data stored in a RAM 202 and a read only memory (ROM) 203.

The RAM 202 includes an area for temporarily storing a computer program and data loaded from the ROM 203, data acquired from the outside via an interface (I/F) 207, and the like. The RAM 202 further includes a work area to be used when the CPU 201 executes various types of processing. In other words, the RAM 202 can be assigned as an image memory, for example, or can provide other various areas as appropriate.

The ROM 203 stores setting data of the client apparatus 200, a software program executable by the client apparatus 200, which is a computer, and the like. An operation unit 204 is formed by a keyboard, a mouse, and the like. The operation unit 204 can input various instructions to the CPU 201 according to an operation performed by a user of the client apparatus 200. A display unit 205 has a screen such as a liquid crystal display (LCD), and displays an image received from the imaging apparatus 100, and a processing result obtained by the CPU 201.

A secondary storage device (an external storage device) 206 is a high-capacity information storage device typified by a hard disc drive device. The external storage device 206 stores an operating system (OS) and computer programs for causing the CPU 201 to realize the functions of the units illustrated in FIG. 2. The external storage device 206 further stores an image received from the imaging apparatus 100.

Computer-executable software programs and data that are stored in the secondary storage device 206 are loaded into the RAM 202 as appropriate according to the control by the CPU 201, so as to be processed by the CPU 201. The I/F 207 is provided for connecting a network such as a LAN and the Internet, and other devices such as a projection device and a display device. The client apparatus 200 can acquire and transmit various types of information via the I/F 207.

Figure 3:
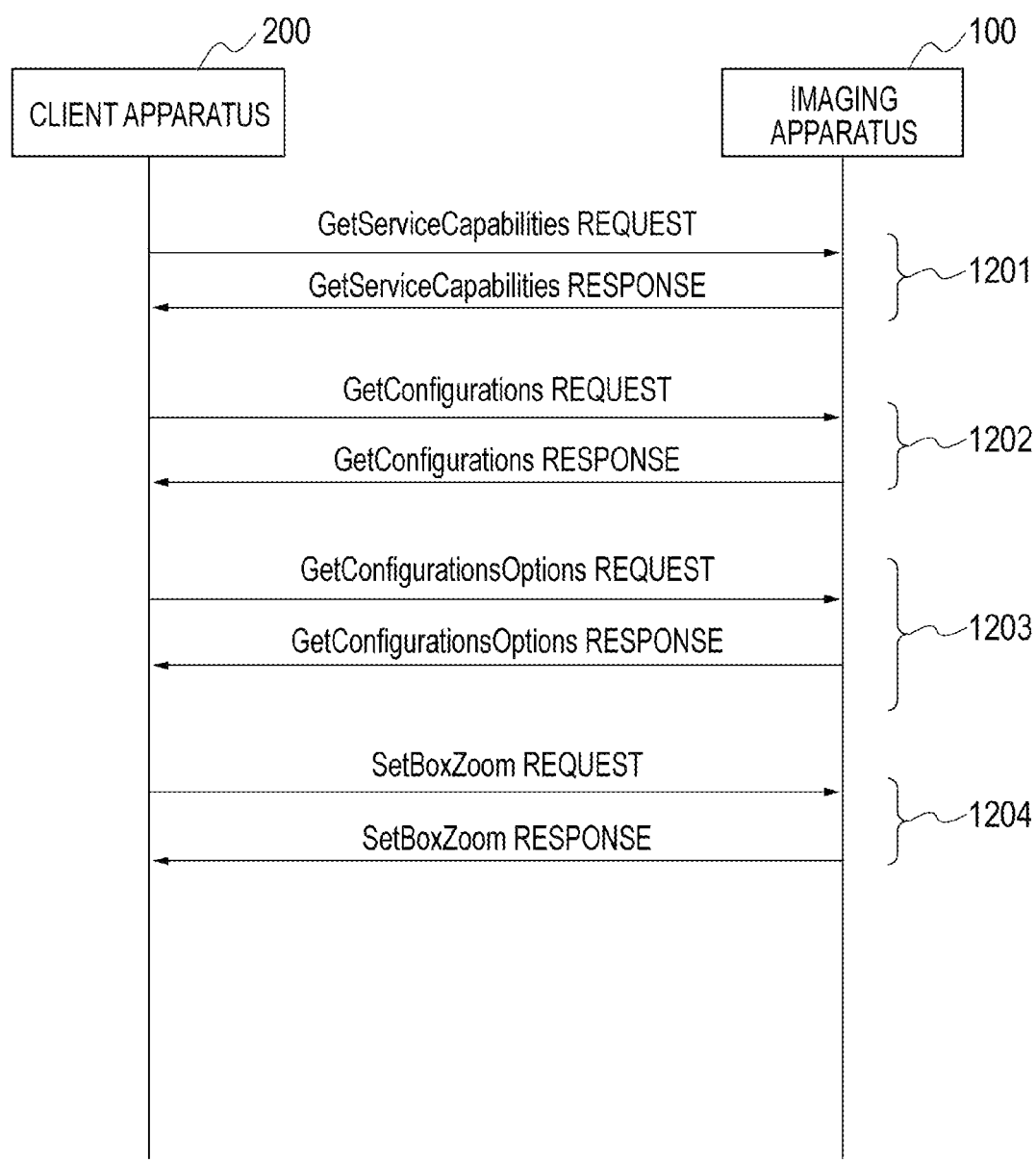
FIG. 3 is a command sequence diagram illustrating an example of an operation according to the present exemplary embodiment.

A typical BoxZoom command sequence performed between the client apparatus 200 and the imaging apparatus 100 for changing pan/tilt/zoom will be described below with reference to FIG. 3. In this sequence, a transaction refers to a pair of a command transmitted from the client apparatus 200 to the imaging apparatus 100 and a response returned from the imaging apparatus 100 to the client apparatus 200 in response to the command.

A transaction 1201 is transaction of a GetServiceCapabilities command. The GetServiceCapabilities command is a command for instructing the imaging apparatus 100 to return function information indicating a function supported by the imaging apparatus 100. The function information includes information about a SetBoxZoom command. The client apparatus 200 generates a SetBoxZoom command including data of a first coordinate and a second coordinate. The first coordinate and the second coordinate are a starting point (e.g., an X1 coordinate) and an ending point (e.g., an X2 coordinate), respectively, which are used when a rectangle frame is designated on a screen of the display unit 205 of the client apparatus 200. Based on the first and the second coordinates included in the received SetBoxZoom command, the imaging apparatus 100 calculates change values of an imaging direction and a zoom magnification in which and at which the imaging apparatus 100 is to be controlled, and the imaging apparatus 100 is driven based on the calculated change values. Specifically, the imaging apparatus 100 calculates a distance from a midpoint of the first and the second coordinates, i.e., a central coordinate of the rectangle designated on an image displayed on the display unit 205 to the center of the image displayed on the display unit 205. Based on a zoom magnification before change and the calculated distance, the imaging apparatus 100 then determines a change amount of an imaging direction. The imaging apparatus 100 further determines a target zoom magnification based on a ratio of the size of an image to be displayed, to the size of the rectangle frame designated by the user.

A transaction 1202 is a transaction of a GetCofigurations command. By transmitting the GetCofigurations command to the imaging apparatus 100, the client apparatus 200 acquires setting information of pan, tilt, and zoom (PTZ) of the imaging apparatus 100. Specifically, in response to the received GetCofigurations command, the imaging apparatus 100 returns, to the client apparatus 200, a list of all the PTZ settings set in the imaging apparatus 100. The list of PTZ settings can include a plurality of PTZ settings, and token information for identifying each PTZ setting. The token information is referred to as a ConfigurationToken in the present exemplary embodiment.

A transaction 1203 is a transaction of a GetConfigurationsOptions command. The client apparatus 200 transmits the GetConfigurationsOptions command including the ConfigurationToken to the imaging apparatus 100. The imaging apparatus 100 transmits, to the client apparatus 200, a GetConfigurationsOptions response storing information about an option available in a setting designated in the ConfigurationToken. For example, in the present exemplary embodiment, the above GetConfigurationsOptions response includes a list of ProfileTokens settable in a SetBoxZoom command. The client apparatus 200 selects a desired ProfileToken from the list of ProfileTokens, and issues a SetBoxZoom command.

A transaction 1204 is a transaction of the foregoing SetBoxZoom command. Based on the command, the client apparatus 200 transmits, to the imaging apparatus 100, a SetBoxZoom command including SetBoxZoom request information, ProfileToken information, the first coordinate, and the second coordinate. Upon receiving the SetBoxZoom command, the imaging apparatus 100 stores the ProfileToken, the first coordinate, and the second coordinate into the RAM 149, and transmits a SetBoxZoom response to the client apparatus 200.

In addition, as described above, the imaging apparatus 100 changes an imaging angle of view of an image being captured by the imaging apparatus 100, based on the first coordinate and the second coordinate. In other words, the imaging apparatus 100 drives a pan/tilt/zoom mechanism based on the first coordinate and the second coordinate.

In addition, if an object possibly exists near the end of an imaging angle of view when the imaging apparatus 100 drives pan, tilt, and zoom mechanisms, the imaging apparatus 100 according to the present exemplary embodiment adjusts the pan, the tilt, and the zoom operations so that the object falls within the angle of view.

FIG. 4A is a diagram illustrating an example of a data structure of a SetBoxZoom command, and FIG. 4B is a diagram illustrating an example of a data structure of a SetBoxZoom response.

In FIG. 4A, the address information of the imaging apparatus 100, which is a transmission destination of a SetBoxZoom command, is stored in a destination address 3001. The address information of the client apparatus 200, which is a transmission source, is stored in a transmission source address 3003. Information indicating a SetBoxZoom request is stored in a field 3005 as a request type. A field 3007 indicates a ProfileToken field. A field 3009 is a starting point coordinate field, and a field 3015 is an ending point coordinate field. The starting point coordinate field 3009 and the ending point coordinate field 3015 each include an X coordinate field and a Y coordinate field. A field 3011 is an X coordinate field of the starting point, and a field 3013 is a Y coordinate field of the starting point. In addition, a field 3017 is an X coordinate field of the ending point, and a field 3019 is a Y coordinate field of the ending point.

On the other hand, in FIG. 4B, a field 3021 is a destination address field, a field 3023 is a transmission source address field, and a field 3025 is a SetBoxZoom response field. In the SetBoxZoom response, information indicating that this response is a SetBoxZoom response is stored in the field 3025 as a response type. In addition, the address information of the client apparatus 200, which is a transmission destination of the SetBoxZoom response, is stored in the destination address 3021. The address information of the imaging apparatus 100, which is a transmission source, is stored in the transmission source address 3023.

In the present exemplary embodiment, if the value of the X coordinate field 3011 of the starting point that is illustrated in FIG. 4A is smaller than the value of the X coordinate field 3017 of the ending point that is illustrated in FIG. 4A, adjustment is performed so that the focal length of the imaging optical system of the imaging apparatus 100 becomes longer (i.e., the value of a zoom magnification becomes larger). In addition, for example, if the value of the X coordinate field 3011 of the starting point is larger than the value of the X coordinate field 3017 of the ending point, adjustment is performed so that the focal length of the imaging optical system of the imaging apparatus 100 according to the present exemplary embodiment becomes shorter (i.e., the value of a zoom magnification becomes smaller). Furthermore, for example, if the value of the X coordinate field 3011 of the starting point is equal to the value of the X coordinate field 3017 of the ending point, pan and tilt of the imaging apparatus 100 are controlled so that a portion of an image that is displayed at a position indicated by the X coordinate value is positioned at the center of the image, without controlling a zoom magnification.

Based on information stored in the SetBoxZoom command, the imaging apparatus 100 starts a pan/tilt/zoom operation. As described above, if the value of the X coordinate field 3011 of the starting point is smaller than the value of the X coordinate field 3017 of the ending point, a so-called zoom-in operation (a zoom operation in a telephoto direction) is performed. In this zoom operation, pan/tilt/zoom is controlled so that a rectangle range designated by the starting point coordinate field 3009 and the ending point coordinate field 3015 is set as an imaging range obtainable after the zoom-in operation. In addition, if the object position determination circuit 140 detects an object near the boundary of the imaging range (near the end position in the imaging angle of view), a pan/tilt/zoom operation is adjusted so that the detected object is positioned within the imaging range.

In addition, as described above, if the value of the X coordinate field 3011 of the starting point is larger than the value of the X coordinate field 3017 of the ending point, a zoom-out operation (a zoom operation in a wide-angle direction) is performed. In this operation, in the imaging apparatus 100 according to the present exemplary embodiment, pan/tilt/zoom is controlled so that a rectangle range defined by the starting point coordinate field 3009 and the ending point coordinate field 3015 corresponds to an imaging angle of view (imaging range) set before the zoom-out operation. In addition, if the object position determination circuit 140 detects an object near the boundary of the imaging range (near the end position in the imaging angle of view), pan/tilt/zoom is finely adjusted so that the detected object is positioned within the imaging range. This zoom-out operation can be performed by storing, into either one or both of the starting point coordinate field 3009 and the ending point coordinate field 3015, a coordinate value indicating that the detected object falls outside a current imaging range.

As described above, in the present exemplary embodiment, an imaging range obtainable after the zoom-out operation may be determined by another designation method. For example, the zoom-out operation may be performed by a method of designating two coordinates in an imaging angle of view set before the zooming out, as the starting point coordinate field 3009 and the ending point coordinate field 3015. In this case, for example, a ratio of an X-direction length of a rectangle designated by the starting point coordinate field 3009 and the ending point coordinate field 3015, to a traverse direction length (an X-direction length) of an imaging range is used as a zoom magnification. Alternatively, a zoom magnification may be designated using a ratio of a Y-direction length of the rectangle designated by the starting point coordinate field 3009 and the ending point coordinate field 3015, to a longitudinal direction length (a Y-direction length) of an imaging range. Furthermore, a zoom magnification may be designated using a ratio between a diagonal direction length of an imaging range and a diagonal direction length of the rectangle designated by the starting point coordinate field 3009 and the ending point coordinate field 3015.

Figure 5:
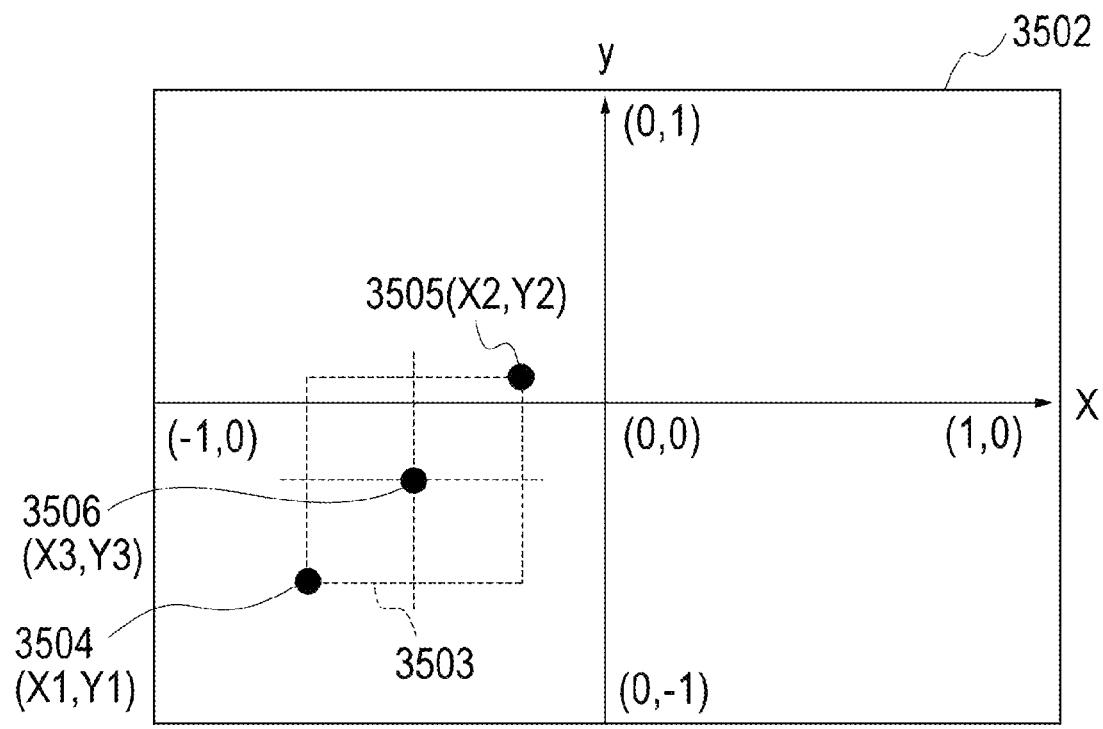
FIG. 5 is a diagram illustrating an example of a coordinate system used in the present exemplary embodiment.

Next, the configuration of a coordinate system used in the present exemplary embodiment will be described with reference to FIG. 5. In FIG. 5, a range 3502 of the coordinate system corresponds to a current imaging range (imaging angle of view) of the imaging apparatus 100. Specifically, the range 3502 of the coordinate system is displayed in a range of a captured image displayed on a display screen in the display unit 205 of the client apparatus 200. The imaging range 3502 corresponds to a range ($-1.0 \leq X \leq 1.0$, $-1.0 \leq Y \leq 1.0$) of the coordinate system of the SetBoxZoom command. This coordinate system is referred to as, for example, a normalized coordinate system. This normalized coordinate system is configured such that an X coordinate value and a Y coordinate value fall within a range from $-1$ to $+1$, without depending upon a pan/tilt/zoom value of the imaging apparatus 100.

A rectangle range 3503 corresponds to a rectangle range designated on an image displayed on the client apparatus 200, and is defined by the starting point coordinate field 3009 and the ending point coordinate field 3015 of the SetBoxZoom command. A coordinate 3504 indicates a starting point (X1, Y1) of the SetBoxZoom command, and a coordinate 3505 indicates an ending point (X2, Y2) of the SetBoxZoom command. In addition, a coordinate 3506 indicates a center point (X3, Y3) of the designated rectangle range. In the example illustrated in FIG. 5, since the X coordinate value X1 of the starting point is smaller than the X coordinate value X2 of the ending point, a zoom-in operation (telephoto operation) is performed to perform adjustment so that the focal length of the imaging optical system becomes longer (so that a zoom magnification becomes higher). In addition, in contrast to the example illustrated in FIG. 5, if the X coordinate value X1 of the starting point is larger than the X coordinate value X2 of the ending point, a zoom-out operation (wide-angle side operation) is performed to perform adjustment so that the focal length of the imaging optical system becomes shorter (so that a zoom magnification becomes lower). In addition, pan and tilt are controlled so that an image portion corresponding to the coordinate 3506 indicating the center point of the rectangle is positioned at the center of an imaging range obtainable after the zoom operation.

In the zooming out, the client apparatus 200 stores, into either one or both of the starting point coordinate field 3009 and the ending point coordinate field 3015, a coordinate value outside the current imaging range. For example, the client apparatus 200 stores a value larger than +1 into either one or both of the starting point X coordinate field 3011 and the starting point Y coordinate field 3013. Alternatively, the client apparatus 200 stores a value smaller than $-1$ into either one or both of the ending point X coordinate field 3017 and the ending point Y coordinate field 3019. In other words, in the present exemplary embodiment, in the zooming out, if the rectangle range 3503 designated by the starting point coordinate field 3009 and the ending point coordinate field 3015 designates a range larger than the current imaging frame (imaging range) 3502, a ratio of zooming out can be designated. Specifically, the designated rectangle range 3503 is set as a coordinate range corresponding to an imaging range set before the zoom operation (i.e., $-1.0 \leq X \leq 1.0$, $-1.0 \leq Y \leq 1.0$). The coordinate value(s) indicating the imaging range 3502 incompatible to the position of this rectangle range 3503 is/are stored into the starting point X coordinate field 3011 and/or the starting point Y coordinate field 3013.

In the present exemplary embodiment, if an object exists near the boundary of the rectangle range 3503 as illustrated in FIG. 5, the object position determination circuit 140 outputs, to the CPU 146, a signal for causing the CPU 146 to finely adjust a pan/tilt/zoom operation. Based on the instruction in the fine adjustment signal, the CPU 146 adjusts the pan/tilt/zoom operation to control the detected object to fall within an imaging range obtainable after the pan/tilt/zoom operation.

Figure 6A:
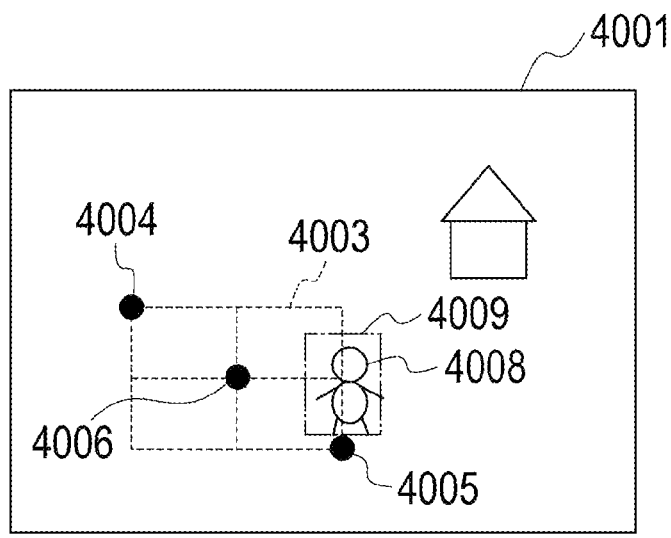
FIGS. 6A and 6B are diagrams for illustrating a designated coordinate and an imaging angle of view according to the present exemplary embodiment.
Figure 6B:
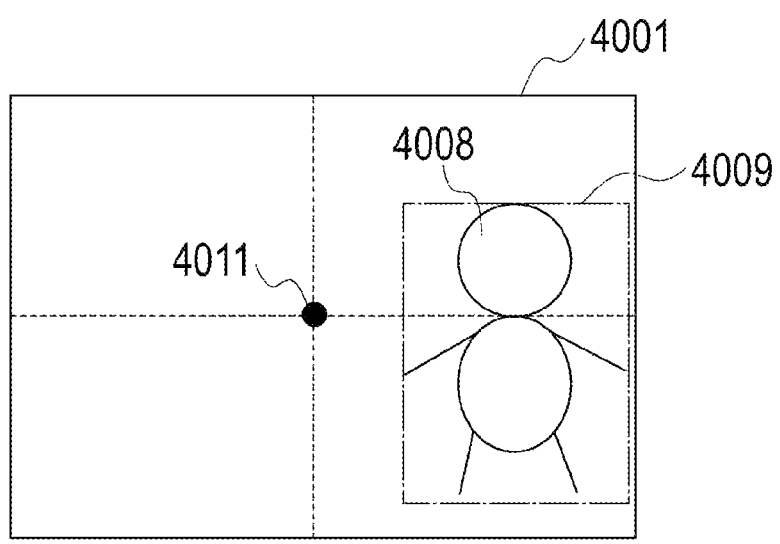

FIGS. 6A and 6B are diagrams each illustrating an example of a display screen of the display unit 205 in the client apparatus 200. An imaging range 4001 indicates an imaging range (imaging angle of view) of the imaging apparatus 100, and a current captured image is displayed within the range. The imaging range 4001 corresponds to the imaging range 3502 illustrated in FIG. 5. A rectangle range 4003 is defined by two points (a starting point 4004 and an ending point 4005) designated on a screen of the display unit 205 by the user using the operation unit 204. The starting point 4004 and the ending point 4005 that define the rectangle range 4003 correspond to the respective pieces of information stored in the starting point coordinate field 3009 and the ending point coordinate field 3015 of the SetBoxZoom command. In addition, a center point 4006 is a central coordinate of the designated rectangle range 4003. An object 4008 is an object detected by the object position determination circuit 140, and a rectangle 4009 is a bounding rectangle of the detected object 4008, and is a target region. In addition, a center point 4011 in FIG. 6B indicates a center point of an angle of view obtainable after the fine adjustment of pan/tilt/zoom.

FIG. 6A illustrates a captured image obtainable before pan/tilt/zoom is controlled based on the designation of the rectangle range 4003. In FIG. 6A, since the X coordinate value of the starting point coordinate 4004 is smaller than the X coordinate value of the ending point coordinate 4005, a zoom-in operation (telephoto side operation) is performed. In the present exemplary embodiment, the CPU 146 is configured to adjust a pan/tilt/zoom operation so that the center point 4006 of the designated rectangle range 4003 is positioned at the center point 4011 of the imaging angle of view obtainable after the pan/tilt/zoom operation.

Nevertheless, when the zoom-in operation is performed, in FIG. 6A, the detected object 4008 is positioned near the boundary of the designated rectangle range 4003. If the zoom-in operation is performed in this state, part of the detected object 4008 falls outside the angle of view. The object position determination circuit 140 therefore outputs a fine adjustment signal to the CPU 146. If the CPU 146 receives the fine adjustment signal, the CPU 146 adjusts, based on information about the bounding rectangle 4009 of the detected object 4008 that is output from the object position determination circuit 140 together with the fine adjustment signal, at least one of the pan, the tilt, and the zoom operations of the imaging apparatus 100 so as to operate the imaging apparatus 100 so that the bounding rectangle 4009 falls within the imaging angle of view.

FIG. 6B is a diagram illustrating a captured image obtainable after the fine adjustment of pan/tilt/zoom. Before the pan/tilt/zoom operation, with respect to the object 4008 positioned near the boundary of the designated rectangle range 4003, pan/tilt/zoom is finely adjusted so that the bounding rectangle 4009 of the detected object 4008, which is a target region, falls within the imaging angle of view.

Figure 7:
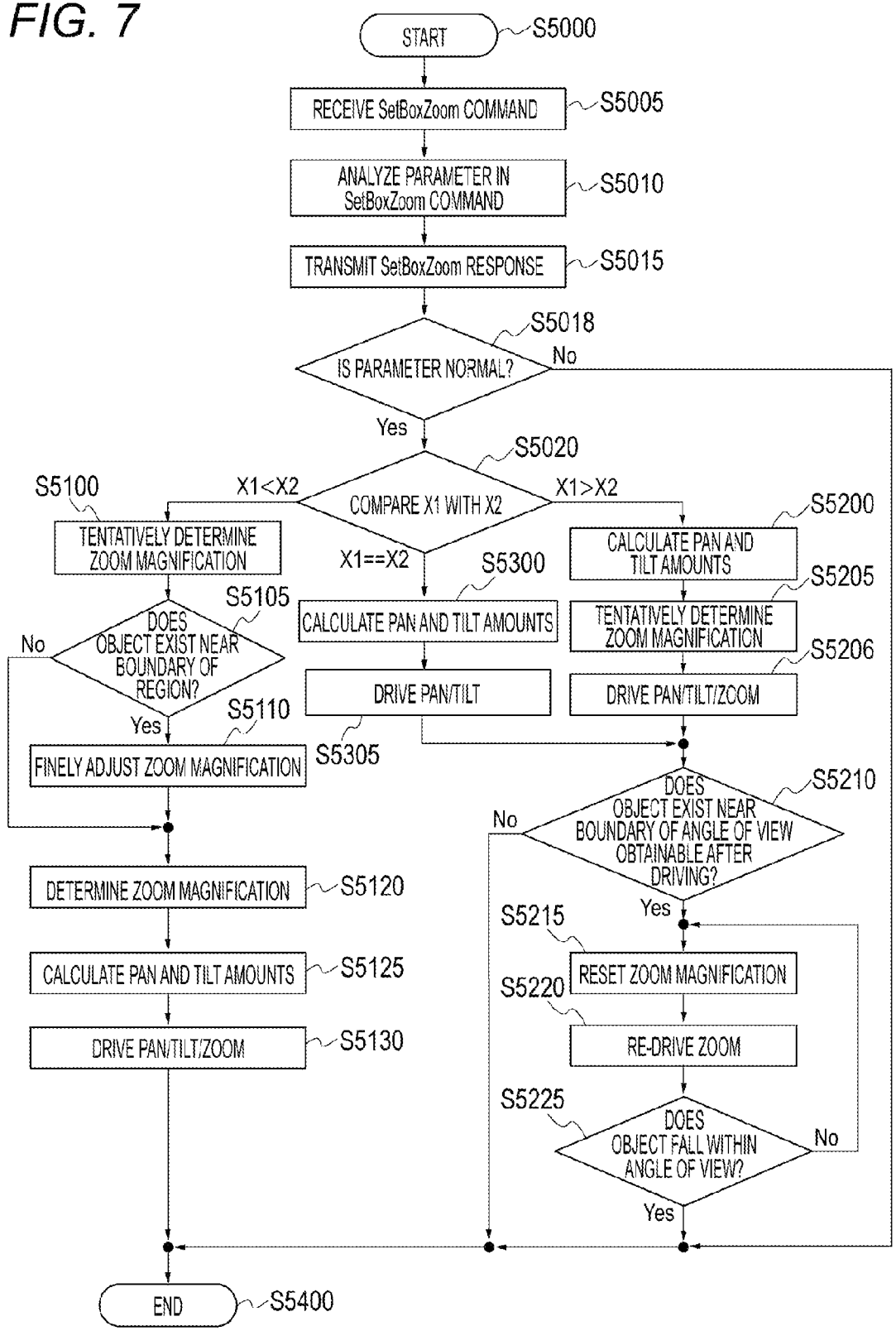
FIG. 7 is a flowchart illustrating an operation of an imaging apparatus according to the present exemplary embodiment.

FIG. 7 is a processing flowchart of an operation of the imaging apparatus 100 that is performed in a case in which a SetBoxZoom command is received from the client apparatus 200.

In FIG. 7, in step S5000, an operation according to the present exemplary embodiment is started. In step S5005, the I/F 134 performs reception processing of a SetBoxZoom command. Then, in step S5010, the CPU 146 analyzes a parameter stored in the received SetBoxZoom command. Examples of the parameter analyzed in this step include the ProfileToken field 3007, the starting point coordinate field 3009, and the ending point coordinate field 3015 that are illustrated in FIG. 4. In step S5015, the CPU 146 transmits a response to the SetBoxZoom command via the I/F 134.

In step S5018, the CPU 146 evaluates an analysis result of the parameter in the SetBoxZoom command. If the parameter is normal (YES in step S5018), the processing proceeds to step S5020. On the other hand, if the parameter is not normal (NO in step S5018), the processing is determined to be inexecutable, and proceeds to step S5400, in which the processing ends. Examples of a not normal (abnormal) parameter include a case in which the value of the ProfileToken field 3007 is a value not set in the imaging apparatus 100. In addition, other examples of an abnormal parameter include a case in which at least either one coordinate value of the starting point coordinate field 3009 and the ending point coordinate field 3015 is in a coordinate range not supported by the imaging apparatus 100. If the parameter is normal (YES in step S5018), the SetBoxZoom response transmitted in step S5015 is a SUCCESS response, whereas if the parameter is abnormal (NO in step S5018), the SetBoxZoom response transmitted in step S5015 is a FAIL response.

If the parameter is normal (YES in step S5018), the processing proceeds to subsequent step S5020, in which the CPU 146 compares the X coordinate value X1 of the starting point with the X coordinate value X2 of the ending point. If the value X1 is smaller than the value X2 in step S5020 ("X1<X2" in step S5020), the processing proceeds to step S5100, in which processing for performing a zoom-in operation is performed.

In step S5100, the CPU 146 tentatively determines a zoom magnification based on the size of a rectangle range defined by the designated starting point coordinate and the ending point coordinate, and the size of an imaging range.

In subsequent step S5105, the CPU 146 determines whether or not the detected object 4008 exists near the boundary of the designated rectangle range 4003. When any coordinate of the four coordinates that define the bounding rectangle 4009 serving as a target region exists inside the rectangle range 4003, and the other coordinates exist outside the rectangle range 4003, the CPU 146 may determine that the detected object 4008 exists at or near the boundary. In addition, if a distance between the center point 4006 of the bounding rectangle 4009 of the detected object 4008 and the boundary of the rectangle range 4003 exists within a predetermined range, the CPU 146 may determine that the detected object 4008 exists near the boundary.

If the detected object 4008 does not exist near the boundary (NO in step S5105), the processing proceeds to step S5120, in which the CPU 146 determines the tentatively determined zoom magnification, as a control target value. On the other hand, if the detected object 4008 exists near the boundary of the designated rectangle range 4003 (YES in step S5105), the processing proceeds to step S5110, in which the CPU 146 determines a finely adjusted zoom magnification, as a control target value.

In step S5110, the CPU 146 finely adjusts a zoom magnification. Specifically, the CPU 146 changes the size of the rectangle range 4003 so that the rectangle range 4003 includes all of the four coordinates that define the bounding rectangle 4009 of the detected object 4008 (target region). The CPU 146 then determines, as a final zoom magnification, a zoom magnification corresponding to the changed size. Alternatively, the size of the rectangle range 4003 may be changed so that the rectangle range 4003 includes a predetermined percentage (e.g., 95%) of the bounding rectangle 4009.

In step S5120, the CPU 146 determines a zoom magnification. In this case, the zoom magnification finely adjusted in step S5110 is determined as a zoom magnification in step S5120. On the other hand, in a case in which it is determined in step S5105 that the detected object 4008 does not exist near the boundary, the zoom magnification determined in step S5120 is equal to the tentatively determined zoom magnification, as described above.

In subsequent step S5125, the CPU 146 calculates a pan amount and a tilt amount. As described above, the pan and the tilt amounts are determined based on a distance between the central coordinate 4006 of the rectangle range 4003 and the center of the imaging range 4001 that are illustrated in FIG. 6A. In step S5130, pan/tilt/zoom is driven based on the determined pan and tilt amounts and zoom magnification, and in subsequent step S5400, the processing according to the present exemplary embodiment ends.

On the other hand, if the X coordinate value X1 of the starting point is larger than the X coordinate value X2 of the ending point in step S5020 ("X1>X2" in step S5020), the processing proceeds to step S5200, in which a zoom-out operation (wide-angle side operation) is performed based on the above-described method.

In step S5200, the CPU 146 calculates a pan amount and a tilt amount based on the difference between the central coordinate 4006 of the rectangle range 4003 and the center point of the coordinate system. Furthermore, in step S5205, the CPU 146 tentatively determines a zoom magnification based on the designated starting point coordinate and ending point coordinate. In subsequent step S5206, at least one of pan, tilt, and zoom is driven based on the calculated pan and tilt amounts, and the tentatively determined zoom magnification.

In step S5210, the CPU 146 determines whether or not an object is detected near the boundary of an imaging angle of view obtainable after the pan/tilt/zoom operation. Specifically, the CPU 146 determines whether or not the bounding rectangle of the detected object is in contact with the boundary of the imaging range (imaging angle of view). In other words, the CPU 146 determines whether or not the bounding rectangle of the detected object is in contact with X=±1 or y=±1 in the coordinate system illustrated in FIG. 5.

If no object is detected near the boundary of the angle of view (NO in step S5210), the processing proceeds to step S5400, in which the processing ends. On the other hand, if an object is detected near the boundary of the angle of view (YES in step S5210), the processing proceeds to step S5215, in which the resetting of a zoom magnification is made.

In step S5220, zoom is controlled again to a value of the reset zoom magnification. In subsequent step S5225, the CPU 146 determines whether or not the detected object falls within the imaging range after the zoom is controlled. If it is determined in step S5225 that the object does not fall within the angle of view (NO in step S5225), that is, if the bounding rectangle 4009 (target region) of the detected object 4008 is in contact with the boundary of the imaging range, the resetting of a zoom magnification in step S5215 and the re-driving of zoom in step S5220 are executed.

In the present exemplary embodiment, by repeating steps S5215, S5220, and S5225, fine adjustment can be performed in the zoom-out operation so that an object positioned near the boundary of an angle of view falls within the angle of view. If it is determined in step S5225 that the object falls within the angle of view (YES in step S5225), the process proceeds to step S5400. In step S5400, the processing according to the present exemplary embodiment ends.

If the X coordinate value X1 of the starting point is equal to the X coordinate value X2 of the ending point in step S5020 ("X1=X2" in step S5020) (or if the difference between the values X1 and X2 is equal to or less than a predetermined value), the processing proceeds to step S5300, in which the CPU 146 performs a so-called centering operation. In step S5300, the CPU 146 calculates a pan amount so that the X coordinate designated in the SetBoxZoom command is positioned at the center point of an imaging range (imaging angle of view) obtainable after the pan/tilt operation (after an imaging direction is changed). In addition, the CPU 146 calculates a tilt amount so that a midpoint of the Y coordinate value Y1 of the starting point and the Y coordinate value Y2 of the ending point is positioned at the center point of the imaging angle of view (or is positioned near the center point). Furthermore, the steps S5020 to S5400 in the flow process of FIG. 7 may be applied to the Y coordinate values in the same manner as to the X coordinate values as described above.

If the pan/tilt is driven in step S5305, the processing proceeds to step S5210, in which the CPU 146 determines whether or not an object is detected near the boundary of an angle of view obtainable after the pan/tilt operation. If an object is detected in step S5210 (YES in step S5210), in subsequent steps S5215, S5220, and S5225, zoom is re-driven so that the detected object falls within the angle of view, as described above. On the other hand, if no object is detected near the boundary of the angle of view obtainable after the pan/tilt operation in step S5210 (NO in step S5210), the processing proceeds to step S5400, in which the processing ends.

In addition, in the above-described processing in the flowchart illustrated in FIG. 7, a zoom magnification is controlled so that a detected object is included in an imaging range. Alternatively, this can be achieved by the processing of changing an imaging direction. For example, in the zoom-in operation, assume that the CPU 146 determines in step S5110 that the X-direction length and Y-direction length of the bounding rectangle 4009 of the detected object 4008 are smaller than the X-direction length and Y-direction length, respectively, of the rectangle range 4003, instead of the calculation of a zoom magnification value. In this case, only by changing an imaging direction (pan/tilt), the detected object 4008 can be included in the imaging range. At this time, the lengths of a portion of the bounding rectangle 4009 of the detected object 4008 that extends from the rectangle range 4003 are obtained in the X coordinate direction and the Y coordinate direction, and a change amount of an imaging direction can be determined based on the obtained lengths. In addition, for example, in the zooming out operation, in step S5215, the CPU 146 may change an imaging direction by a predetermined amount in a direction of a portion where the bounding rectangle of the detected object is in contact with the boundary of the imaging range, instead of resetting of a zoom magnification value. Then, the processing may end when the bounding rectangle falls within the imaging range, and the bounding rectangle is no longer in contact with the boundary of the imaging range.

In addition, in the present exemplary embodiment, the client apparatus 200 may inquire of the imaging apparatus 100 about capability information indicating whether or not an object detection rule is settable, and an operation may be controlled based on the result. In this case, in the present exemplary embodiment, if a subject matching the above object detection rule is detected near the boundary, the pan/tilt/zoom operation is finely adjusted. Alternatively, control may be performed in the following manner. More specifically, the user presets a target region, and position information of the target region is stored in the imaging apparatus 100. If the preset target region is detected near the boundary, control is performed so that the preset target region falls within an angle of view.

In addition, it is possible to inquire of the imaging apparatus 100 according to the present exemplary embodiment about capability information indicating whether or not a SetBoxZoom command is executable, using a GetConfigurationsOptions command. At this time, the imaging apparatus 100 transmits a response including information indicating that the SetBoxZoom command is executable. With this configuration, the above operation can be performed based on the response to the GetConfigurationsOptions command, even if the client apparatus 200 has never previously connected to the imaging apparatus 100.

In addition, in the above exemplary embodiment, the description has been given of a configuration in which an imaging apparatus changes an imaging range by controlling pan/tilt/zoom. Alternatively, the present invention is also applicable to a configuration in which an imaging range is fixed and a partial imaging region in the imaging range is extracted as an imaging range. For example, the coordinate values 4004 and 4005 in the captured image (imaging range) 4001 in FIG. 6A are received from the client apparatus 200. In this case, a partial region in the captured image 4001 that is originally to be extracted is a rectangular region (rectangle range) 4003 having a diagonal line connecting the coordinate values 4004 and 4005. Nevertheless, since the target region 4009 exists near the boundary of the rectangular region 4003, a region to be extracted is adjusted as illustrated in FIG. 6B. The extracted part of the captured image is transmitted to the client apparatus 200.

According to the present exemplary embodiment, an image of a region originally desired by the user can be appropriately obtained.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-233793, filed Nov. 18, 2014, which is hereby incorporated by reference herein in its entirety.

What is claimed is:

1. An imaging apparatus, comprising:
a reception unit configured to receive a first command including information indicating a first coordinate value and a second coordinate value, from a client apparatus;
a control unit configured to set an imaging range to be captured with the imaging apparatus; and
a determination unit configured to determine whether or not an object to be detected exists at a boundary of the imaging range, the imaging range corresponding to the first coordinate value and the second coordinate value that are included in the first command received by the reception unit,
wherein, in a case in which the determination unit determines that the object to be detected exists at the boundary of the imaging range, the control unit adjusts an imaging range to be captured, from the imaging range corresponding to the first coordinate value and the second coordinate value to an imaging range including the object to be detected by changing an imaging direction of the imaging apparatus, and an amount of the change in the imaging direction of the imaging apparatus is determined on a basis of a distance from a midpoint of the first coordinate and the second coordinate to the center of the captured image and on a basis of a zoom magnification before the change in the imaging direction, and
wherein in a case in which the determination unit determines that the object to be detected does not exist at the boundary of the imaging range, the control unit sets an imaging range to be captured, to the imaging range corresponding to the first coordinate value and the second coordinate value.

2. The imaging apparatus according to claim 1, wherein the control unit sets an imaging range of the imaging apparatus by controlling driving of at least one of pan, tilt, and zoom operations of the imaging apparatus.

3. The imaging apparatus according to claim 1, wherein the control unit sets, as an imaging range, a range to be extracted from a captured image of the imaging apparatus.

4. The imaging apparatus according to claim 1, further comprising:
a change unit of a focal length configured to change a focal length of the imaging apparatus,
wherein in a case in which at least part of the first coordinate value in the first command is larger than at least part of the second coordinate value, the change unit of a focal length changes a focal length to be longer,
wherein in a case in which at least part of the first coordinate value in the first command is smaller than at least part of the second coordinate value, the change unit of a focal length changes a focal length to be shorter,
wherein in a case in which a difference between the first coordinate value and the second coordinate value that are included in the first command is smaller than a predetermined value, a change unit of an imaging direction changes an imaging direction so that the first coordinate value indicates a position near a center point of the imaging range to be captured, and
wherein the change unit of an imaging direction changes an imaging direction of an imaging optical system so that the object to be detected is positioned within the imaging range to be captured.

5. The imaging apparatus according to claim 1, wherein in a case in which the determination unit determines that the object to be detected exists at the boundary of the imaging range, the control unit adjusts the imaging range to be captured so that the object to be detected is positioned within an imaging range.

6. The imaging apparatus according to claim 1, further comprising a motion detection unit configured to detect a moving object from an image captured by the imaging apparatus,
wherein the object to be detected is the moving object.

7. The imaging apparatus according to claim 1, further comprising:
a detection unit configured to detect at least one of a face and a human body from an image captured by the imaging apparatus,
wherein the object to be detected is either one of the face and the human body.

8. The imaging apparatus according to claim 1, further comprising a setting unit configured to set a position of the object to be detected according to an instruction from a user.

9. The imaging apparatus according to claim 1,
wherein the reception unit receives a second command for inquiring whether the first command is executable, and
wherein the imaging apparatus further comprises a transmission unit configured to transmit information indicating that the first command is executable.

10. A control method of an imaging apparatus, the control method comprising:
a reception step of receiving a first command including information indicating a first coordinate value and a second coordinate value, from a client apparatus;
a control step of controlling an imaging range of the imaging apparatus; and
a determination step of determining whether or not an object to be detected exists at a boundary of the imaging range, the imaging range corresponding to the first coordinate value and the second coordinate value that are included in the first command received in the reception step,
wherein, in a case in which it is determined in the determination step that the object to be detected exists at the boundary of the imaging range, the control step includes adjusting an imaging range to be captured, from the imaging range corresponding to the first coordinate value and the second coordinate value to an imaging range including the object to be detected by changing an imaging direction of the imaging apparatus, and an amount of the change in the imaging direction of the imaging apparatus is determined on a basis of a distance from a midpoint of the first coordinate and the second coordinate to the center of the captured image and on a basis of a zoom magnification before the change in the imaging direction, and
wherein, in a case in which it is determined in the determination step that the object to be detected does not exist at the boundary of the imaging range, the control step includes setting an imaging range to be captured, to the imaging range corresponding to the first coordinate value and the second coordinate value.

11. The control method according to claim 10, wherein in the adjusting, an imaging range of the imaging apparatus is adjusted by controlling driving of at least one of pan, tilt, and zoom of the imaging apparatus.

12. The control method according to claim 10, further comprising:
a motion detection step of detecting a moving object from an image captured by the imaging apparatus,
wherein the object to be detected is the moving object.

13. The control method according to claim 10, further comprising:
a detection step of detecting at least one of a face and a human body from an image captured by the imaging apparatus,
wherein the object to be detected is either one of the face and the human body.

14. The control method according to claim 10, further comprising a setting step of setting a position of the object to be detected according to an instruction from a user.

15. A non-transitory computer-readable memory storing a program for executing a control method of an imaging apparatus, the control method comprising:
a reception step of receiving a first command including information indicating a first coordinate value and a second coordinate value, from a client apparatus;
a control step of controlling an imaging range of the imaging apparatus; and
a determination step of determining whether or not an object to be detected exists at a boundary of an imaging range corresponding to the first coordinate value and the second coordinate value that are included in the command received in the reception step,
wherein, in a case in which it is determined in the determination step that the object to be detected exists at the boundary of the imaging range, the control step includes adjusting an imaging range to be captured, from the imaging range corresponding to the first coordinate value and the second coordinate value to an imaging range including the object to be detected by changing an imaging direction of the imaging apparatus, and an amount of the change in the imaging direction of the imaging apparatus is determined on a basis of a distance from a midpoint of the first coordinate and the second coordinate to the center of the captured image and on a basis of a zoom magnification before the change in the imaging direction, and
wherein, in a case in which it is determined in the determination step that the object to be detected does not exist at the boundary of the imaging range, the control steps includes stetting an imaging range to be captured, to the imaging range corresponding to the first coordinate value and the second coordinate value.

16. The non-transitory computer-readable memory according to claim 15, wherein in the adjusting, an imaging range of the imaging apparatus is adjusted by controlling driving of at least one of pan, tilt, and zoom.

17. The non-transitory computer-readable memory according to claim 15, further comprising:
a motion detection step of detecting a moving object from an image captured by the imaging apparatus,
wherein the object to be detected is the moving object.

18. The non-transitory computer-readable memory according to claim 15, further comprising:
a detection step of detecting at least either one of a face and a human body from an image captured by the imaging apparatus,
wherein the object to be detected is either one of the face and the human body.

19. The non-transitory computer-readable memory according to claim 15, further comprising a setting step of setting a position of the object to be detected according to an instruction from a user.

20. The imaging apparatus according to claim 1,
wherein the determination unit determines that the object to be detected exists at the boundary of the imaging range corresponding to the first coordinate value and the second coordinate value that are included in the first command received by the reception unit, if a part of the object to be detected exists within the imaging range and the object to be detected except for the part of the object to be detected exists out of the imaging range.

21. The imaging apparatus according to claim 1,
wherein the determination unit determines that the object to be detected exists at the boundary of the imaging range corresponding to the first coordinate value and the second coordinate value that are included in the first command received by the reception unit, if a distance between the center of the object to be detected and the boundary of the imaging range is within a predetermined range.

22. The control method according to claim 10,
wherein the determination step determines that the object to be detected exists at the boundary of the imaging range corresponding to the first coordinate value and the second coordinate value that are included in the first command received by the reception step, if a part of the object to be detected exists within the imaging range and the object to be detected except for the part of the object to be detected exists out of the imaging range.

23. The control method according to claim 10,
wherein the determination step determines that the object to be detected exists at the boundary of the imaging range corresponding to the first coordinate value and the second coordinate value that are included in the first command received by the reception step, if a distance between the center of the object to be detected and the boundary of the imaging range is within a predetermined range.

24. The non-transitory computer-readable memory according to claim 15,
wherein the determination step determines that the object to be detected exists at the boundary of the imaging range corresponding to the first coordinate value and the second coordinate value that are included in the first command received by the reception step, if a part of the object to be detected exists within the imaging range and the object to be detected except for the part of the object to be detected exists out of the imaging range.

25. The non-transitory computer-readable memory according to claim 15,
wherein the determination step determines that the object to be detected exists at the boundary of the imaging range corresponding to the first coordinate value and the second coordinate value that are included in the first command received by the reception step, if a distance between the center of the object to be detected and the boundary of the imaging range is within a predetermined range.

* * * * *